United States Patent [19]

Lim

[11] Patent Number: 5,771,073
[45] Date of Patent: Jun. 23, 1998

[54] ADVANCED TELEVISION SYSTEM USING A DIFFERENT ENCODING TECHNIQUE FOR NON-IMAGE AREAS

[75] Inventor: Jae S. Lim, Winchester, Mass.

[73] Assignee: Massachusetts Institute of Technology, Cambridge, Mass.

[21] Appl. No.: 478,746

[22] Filed: Jun. 7, 1995

[51] Int. Cl.$^6$ .................................................. H04N 7/12
[52] U.S. Cl. ........................... 348/390; 348/420; 348/441
[58] Field of Search .................................. 348/634, 420, 348/409, 441, 445, 444, 451, 452, 390, 384; 358/335, 432; H04N 7/12

[56] References Cited

U.S. PATENT DOCUMENTS

| | | | |
|---|---|---|---|
| 3,781,818 | 12/1973 | Pardoe et al. | 340/172.5 |
| 3,848,082 | 11/1974 | Summers | 178/5.6 |
| 3,912,872 | 10/1975 | Callens | 179/15 BA |
| 4,198,651 | 4/1980 | Barton et al. | 358/21 V |
| 4,309,719 | 1/1982 | Hinn | 358/21 R |
| 4,611,225 | 9/1986 | Powers | 358/140 |
| 4,639,779 | 1/1987 | Greenberg | 358/142 |
| 4,641,188 | 2/1987 | Dischert | 358/140 |
| 4,679,091 | 7/1987 | Kikuchi et al. | 358/242 |
| 4,688,082 | 8/1987 | Kato | 358/21 R |
| 4,759,018 | 7/1988 | Buchner | 370/112 |
| 4,794,456 | 12/1988 | Tsinberg | 358/141 |
| 4,800,426 | 1/1989 | Glenn | 358/141 |
| 4,838,685 | 6/1989 | Martinez et al. | 352/85 |
| 4,843,468 | 6/1989 | Drewery | 358/140 |
| 4,860,098 | 8/1989 | Murphy | 358/139 |
| 4,881,125 | 11/1989 | Krause | 358/141 |
| 4,931,855 | 6/1990 | Salvadorini | 358/12 |
| 4,961,112 | 10/1990 | Sugimori et al. | 358/141 |
| 4,962,428 | 10/1990 | Tong et al. | 358/188 |
| 4,967,273 | 10/1990 | Greenberg | 358/142 |
| 4,985,767 | 1/1991 | Haghiri et al. | 358/133 |
| 5,008,746 | 4/1991 | Bernard et al. | 358/133 |
| 5,010,392 | 4/1991 | Croll | 358/21 R |
| 5,010,405 | 4/1991 | Schreiber et al. | 358/141 |
| 5,025,309 | 6/1991 | Isnardi | 358/12 |
| 5,053,859 | 10/1991 | Lucas | 358/12 |
| 5,055,927 | 10/1991 | Keesen et al. | 358/133 |
| 5,070,404 | 12/1991 | Bullock et al. | 358/142 |
| 5,075,773 | 12/1991 | Pullen et al. | 358/141 |
| 5,083,205 | 1/1992 | Arai | 358/140 |
| 5,128,791 | 7/1992 | LeGall et al. | 358/141 |
| 5,132,793 | 7/1992 | Hirahata et al. | 358/140 |
| 5,138,659 | 8/1992 | Kelkar et al. | 380/20 |
| 5,187,575 | 2/1993 | Lim | 358/140 |
| 5,218,436 | 6/1993 | Sugiyama et al. | 358/141 |
| 5,226,114 | 7/1993 | Martinez et al. | 395/128 |
| 5,235,421 | 8/1993 | Yang | 358/141 |
| 5,285,498 | 2/1994 | Johnston | 381/2 |
| 5,327,235 | 7/1994 | Richards | 348/441 |
| 5,347,318 | 9/1994 | Kobayashi et al. | 348/556 |
| 5,353,119 | 10/1994 | Dorricott et al. | 348/446 |
| 5,394,249 | 2/1995 | Shimoda et al. | 358/335 |
| 5,408,270 | 4/1995 | Lim | 348/429 |
| 5,428,454 | 6/1995 | Kimura et al. | 358/335 |
| 5,508,743 | 4/1996 | Iizuka | 348/415 |
| 5,535,013 | 7/1996 | Murata | 358/432 |

FOREIGN PATENT DOCUMENTS 0 402 992   12/1990   European Pat. Off. .

OTHER PUBLICATIONS

Faroudja et al., "Improving NTSC to Achieve Near–RGB Performance," SMPTE Journal, pp. 750–761 (Aug. 1987).
Faroudja et al., "A Progress Report on Improved NTSC," SMPTE Journal, pp. 817–822 (Nov. 1989).

(List continued on next page.)

*Primary Examiner*—Tommy P. Chin
*Assistant Examiner*—Y. Lee
*Attorney, Agent, or Firm*—Fish & Richardson P.C.

[57] ABSTRACT

For a television signal having a succession of video frames, at least some of which have an image area and a non-image area, a frame having a non-image area is encoded by generating identification data descriptive of the location within the frame of the non-image area, video encoding only the image area to produce encoded image data, and providing the identification data and the encoded image data as outputs for subsequent decoding of the frame.

16 Claims, 8 Drawing Sheets

OTHER PUBLICATIONS

Hurst, "Interlace to Progressive Migration for the Transmission Path," David Sarnoff Research Center (1993).

Lim, *Two Dimensional Signal and Image Processing*, pp. 513–515, 577–580, 671–673 Prentice Hall (1990).

"Channel Compatible DigiCipher HDTV System," submitted by Massachusetts Institute of Technology on behalf of The American Television Alliance (May 14, 1992).

"Proposed Improvements for CCDC HDTV System," Massachusettes Institute of Technoloby on behalf of The American Television Alliance (Nov. 2, 1992).

"System Improvements Approved for CCDC HDTV System," submitted by Massachusetts Institute of Technology on behalf of The American Television Alliance (Nov. 23, 1992).

Monta et al., "Source Adaptive Processing for ATV System Design," 132nd SMPTE Technical Conference, New York (Oct. 13–17, 1990).

Parulski et al., "Source–Adaptive Encoding Options for HDTV and NTSC," SMPTE Journal, pp. 674–683 (Oct. 1992).

Pratt, *Digital Image Processing*, John Wiley & Sons, Inc., pp. 591–735 (1978).

Puri, "Picture Format Scalable Coding for HDTV," ISO/IEC JTC1/SC29/WG11, MPEG 1993/390, Sydney, Australia (Mar. 1993).

Schreiber, "Improved Television Systems: NTSC and Beyond," SMPTE Journal, vol. 66, No. 8, (Aug. 1987).

Schreiber, "Psychophysics and the Improvement of Television Image Quality," SMPTE Journal, vol. 93, No. 8 (Aug. 1984).

Schreiber et al., "Reliable EDTV/HDTV Transmission in Low–Quality Analog Channels," SMPTE Journal, pp. 496–503 (Jul. 1989).

"Information Technology—Generic Coding of Moving Pictures and Associated Audio Information: Video," Recommendation H.262, ISO/IEC 13818–2 Draft International Standard (May 1994).

Copy of International Search Report for PCT/US96/09883.

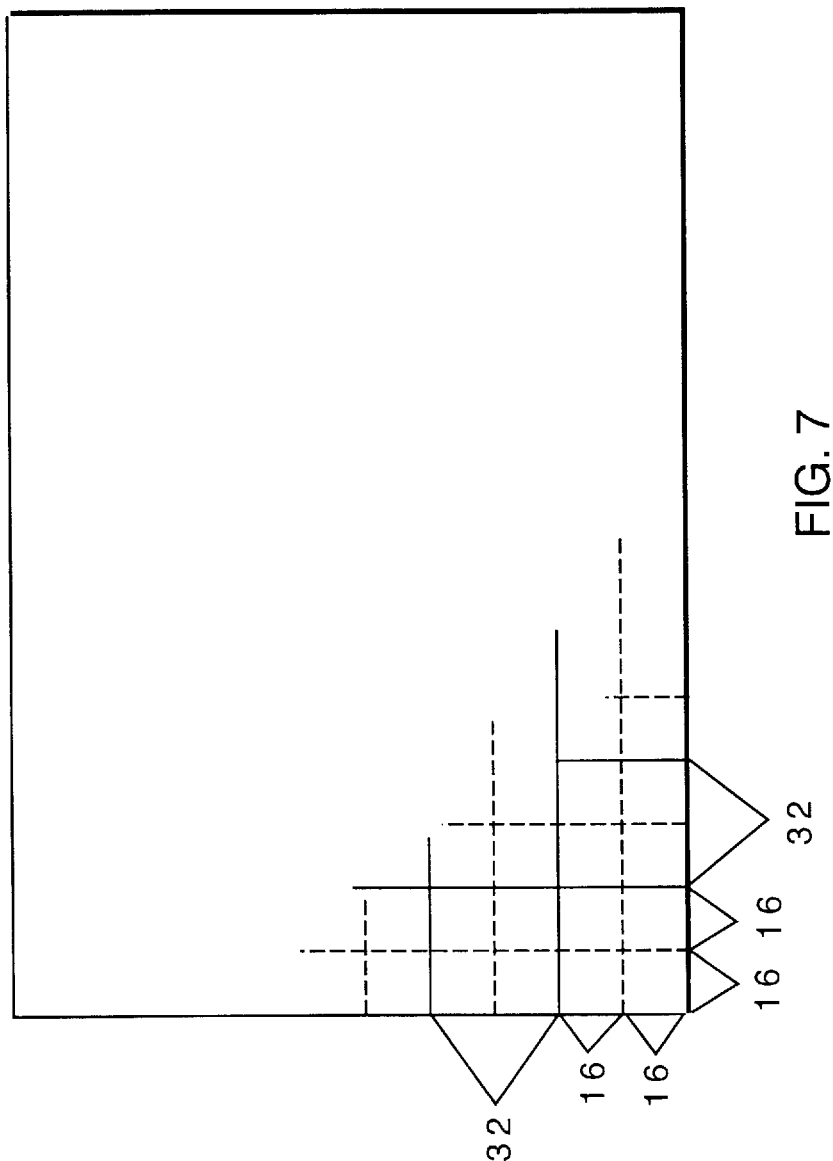

ADVANCED TELEVISION SYSTEM USING A DIFFERENT ENCODING TECHNIQUE FOR NON-IMAGE AREAS

BACKGROUND OF THE INVENTION

This invention relates to video compression in image transmission systems, such as advanced television systems.

FIG. 1 shows a typical video transmission system. Video images are transmitted from a video production system 12 to a video reception system 14 through a transmission channel 10. Within the video production system 12, video production equipment 16 generates a video signal (e.g., a standard television signal) and outputs the signal one frame at a time. The format of each frame is determined by the type of production equipment used, and the spatial resolution (aspect ratio) of the video image depends upon the production format. For example, a video image may have a spatial resolution of 960×720 pixels/frame (i.e., a 12×9 aspect ratio). The production equipment 16 outputs a format signal indicating the production format of the video signal. The various video formats and the corresponding aspect ratios are typically standardized, formally or informally, and are not described here.

The video format used by the production equipment 16 frequently does not match the transmission format of the channel 10. For example, the transmission format may be a standard ATV (ADVANCED TELEVISION) format having an aspect ratio of 16×9 (e.g., 1280×720 pixels/frame). Thus, the video production system 12 often must convert video images from the production format to the transmission format. A format decoder 18 decodes the format signal and provides the decoded information to a format transformation device 20. This device 20 uses the decoded format information to convert each video image from the production format to the proper transmission format.

Once a video image has been format transformed, an image coder 22 compresses the image using known compression techniques, such as intra-coding and inter-coding, both of which are described below. A channel encoder 24 then encodes the compressed video image and some of the transmission format signal and transmits them through the channel 10.

At the video reception system 14, a channel decoder 26 receives and decodes the compressed video image and the transmission format signal. An image decoder 28 then decompresses the compressed video signal. Because the display format of a video image may differ from its transmission format, the video reception system 14 often must transform the format of the video image. For example, the transmission format may be a 1280×720 pixel/frame ATV format while the display format may be a 1920×1080 pixel/frame ATV format. As a result, a format decoder 30 decodes the transmission format signal and provides the decoded signal to a format transformation device 32. The format transformation device 32 uses the decoded format signal to convert the video image to the proper display format. The video image is then provided to a video display 34, such as an ATV display.

FIG. 2A shows a typical image coder 22. The image coder 22 receives the video image in transmission format and compresses the image either by intra-coding (i.e., coding the image itself) or inter-coding (i.e., coding a motion-compensated residual image). The image coder 22 typically uses inter-coding, and switches to intra-coding for scene changes and comparable cases.

To generate an inter-coded signal, a motion estimator 36 measures motion between an image frame and the preceding frame and generates motion vectors to describe this motion. A motion compensator 38 then uses the motion vectors to produce a motion-compensated frame, which is subtracted from the image frame to form a motion-compensated residual frame. An image compressor 40 compresses the residual frame and provides the compressed frame to the channel encoder. The motion estimator also supplies the motion vectors to the channel encoder so that they may be transmitted to the image decoder 28 (FIG. 2B) for reconstruction of the video image. The channel encoder 24 encodes the residual frame and the motion vectors and transmits them through the channel 10.

In cases such as scene changes, in which the residual signal energy is greater than the image energy, the image coder 22 intra-codes the video image. For intra-coding, the image frame is compressed instead of a motion-compensated residual. Motion vectors are replaced by data which indicates that the image, and not a motion-compensated residual, has been encoded.

In general, the image coder 22 divides a video frame into blocks and determines whether to inter-code or intra-code on a block-by-block basis. Thus, some blocks in a frame may be inter-coded while other blocks are intra-coded. When a block is inter-coded, the block has motion vectors associated with it. For an intra-coded block, the motion vectors are replaced by data indicating that motion compensation was not performed on the block. In addition, for each block within a frame, certain information about the block, such as block description information, is encoded along with the video data contained in the block. Information about the frame also is encoded in a frame header attached to the frame. Typically, the blocks in a frame are 8×8 pixels or 16×16 pixels.

FIG. 2B shows a typical image decoder. Coded data is received from the channel 10 and decoded by the channel decoder 26. The compressed residual image (inter-coding) or video image (intra-coding) is provided to an image decompressor 42, and the motion vectors or intra-coding data is provided to a motion compensator 44. If the image coder 22 used inter-coding to compress the video image, the motion compensator 44 uses the motion-vectors to produce a motion-compensated frame, which is then added to the decompressed residual frame to reconstruct the video image. The reconstructed image is then converted to the proper display format and displayed. If the video was intra-coded, the decompressed video image itself is converted to the proper display format and displayed. The choice between inter-coding and intra-coding may be made on a block by block basis.

FIGS. 3A through 3C illustrate ways of transforming the format of a video image. FIG. 3A shows an original video frame 46 from a film source (e.g., a movie camera) having a 2×1 aspect ratio. FIG. 3B shows an ATV video frame 48, which has an aspect ratio of 16×9. To transmit the original image 46 through an ATV transmission system in this case, the original image 46 must be altered to have an aspect ratio of 16×9. In general, format transformation occurs in one of three ways, each of which is depicted in FIG. 3C: 1) portions 50a, 50b of the original image 46 are discarded, 2) blank regions 52a, 52b are added to the image 46, or 3) portions 50a, 50b are discarded and blank regions 52a, 52b are added. Each of these techniques has disadvantages, however. For example, when image regions are discarded, part of the original image is lost. Inserting blank regions into the image requires compression of areas that do not actually contain part of the image, thereby decreasing the number of compression bits devoted to coding the image itself. Combining these transformation methods couples these adverse affects.

FIGS. 4A through 4C illustrate additional ways of transforming the format of a video image. FIG. 4A shows an ATV video frame 54 in 640×360 pixel/frame format. FIG. 4B shows an ATV video frame 56 in 1280×720 pixel/frame transmission format. To transmit video frame 54 of FIG. 4A in the format of FIG. 4B, the size of frame 54 must be transformed in one of two ways: 1) the image contained in frame 54 is interpolated to expand the size of the image, or 2) the image contained in frame 54 is surrounded by a blank region 58. If a blank region 58 is used, traditional compression techniques treat the blank region 58 as part of the image, thereby decreasing the number of bits available for compression of the image itself.

SUMMARY OF THE INVENTION

In one aspect, the invention relates to encoding a television signal that has a succession of video frames, at least some of the frames having an image area and a non-image area. For a frame having a non-image area, identification data is generated to describe the location within the frame of the non-image area, and only the image area is encoded.

In preferred embodiments, the frame of video is broken into a plurality of blocks each of which is separately encodable; the identification data specifies which of the blocks make up the non-image area; and the blocks in the image area are encoded using either inter-coding or intra-coding. The non-image area may be either a blank region, or an area that in the production frame contains image material but that is to be left blank in the transmitted frame.

In another aspect, the invention relates to processing encoded information to reconstruct a video frame having an image area and a non-image area. Identification data corresponding to the non-image area and encoded image data corresponding to the image area are received. The encoded image is decoded to generate the image area, the identification information is used to generate the non-image area, and the image and non-image areas are combined.

In preferred embodiments, the image may be expanded into the non-image area by interpolating the image contained in the image area; the video frame may be displayed; an image other than the decoded image may be displayed in the non-image area; and the dimensions of the non-image area may be altered to give the video frame a predetermined spatial resolution.

Other features of the invention will be apparent from the following description of preferred embodiments, and from the claims.

BRIEF DESCRIPTION OF THE DRAWINGS

FIG. 7 is a schematic illustration of blocks within a video frame.

DESCRIPTION OF THE PREFERRED EMBODIMENTS

Figure 5:
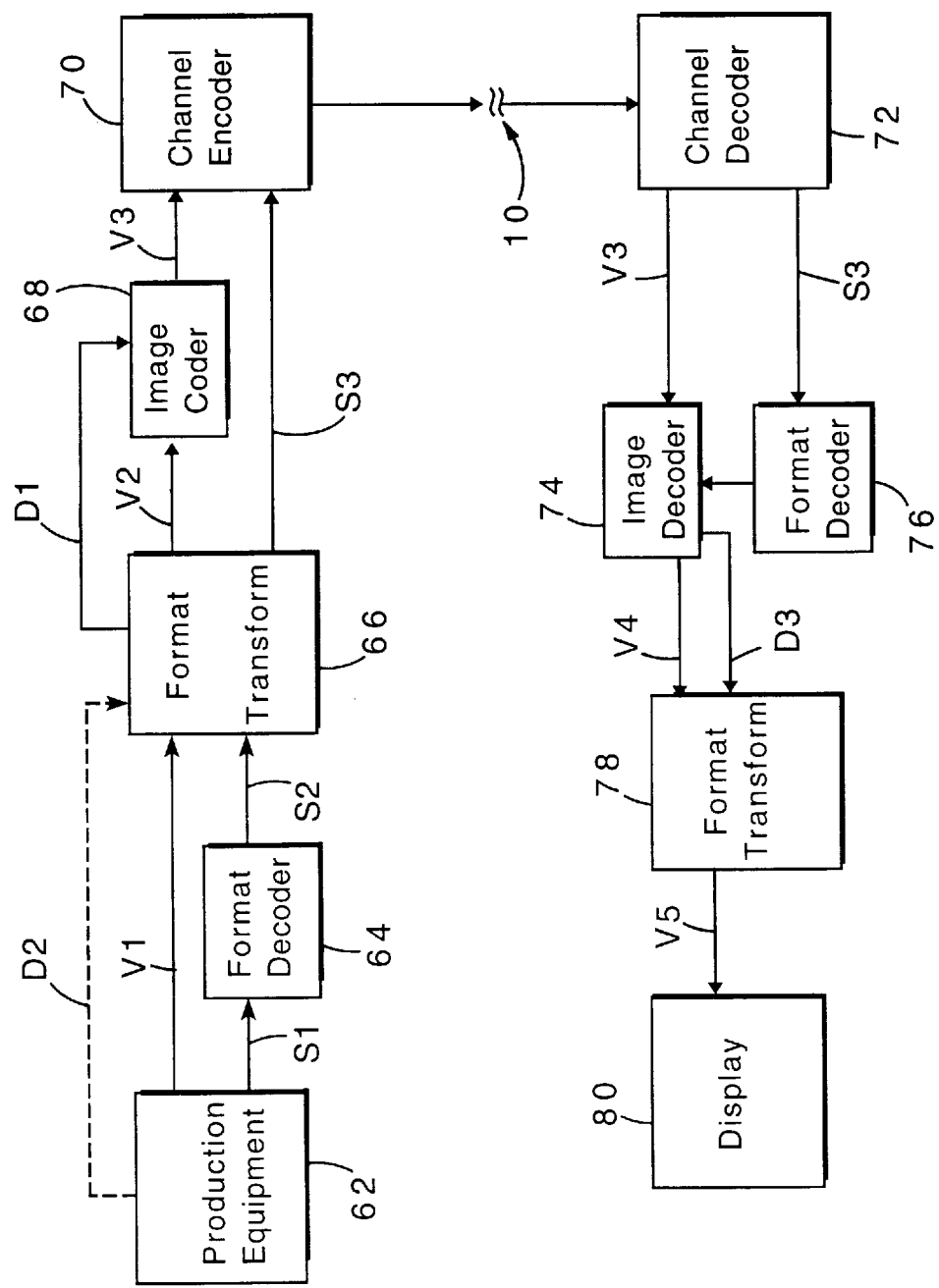
FIG. 5 is a functional block diagram of a video transmission system according to an embodiment of the invention.

FIG. 5 is a block diagram of a video transmission system. The video transmission system improves video compression efficiency by identifying non-image areas within each video frame and by encoding identification information for each non-image area instead of inter-coding or intra-coding the area. Examples of non-image areas are blank regions within a video frame and portions of the video image that are not to be treated an image area. Video production equipment 62 produces an original video image frame V1 and generates a production format signal S1 that indicates the frame's format. A format decoder 64 decodes the format signal S1 and provides the decoded signal S2 to a format transformation device 66, which uses the decoded format signal S2 to convert the original video image frame V1 into a video image frame V2 having the proper transmission format.

Because the format transformation may require the addition of blank regions to the original image frame V1, the transformation device 66 monitors whether the transformed frame V2 contains blank regions, and if so, where the blank regions are located within the frame. If the video frame V2 does contain blank regions, the identification data D1 specifies their locations.

The format transformation device 66 provides the video frame V2 and the corresponding identification data D1 (if any) to an image coder 68, which generates a compressed video frame V3. The identification data D1 is used to encode blank regions within the video frame V2, as described below. The compressed video frame V3 is then encoded by a channel encoder 70 and transmitted through the video channel 10, along with a transmission format signal S3 generated by the format transformation device 66.

The production equipment 62 also may insert blank regions or other non-image areas into the original image V1. In this situation, the production equipment 62 generates data D2 that identifies the non-image areas and provides the data D2 to the format transformation device 66. The transformation device 66 includes the data D2 in the identification data D1 that identifies the blank regions inserted by the format transformation device 66.

When the video information is received by a channel decoder 72, the compressed video frame V3 is provided to an image decoder 74, and the transmission format signal S3 is provided to a format decoder 76. The format decoder 76 decodes the transmission format signal to produce format information which is used by the image decoder 74. The image decoder 74 uses, on a block-by-block basis, the intercoding and intra-coding techniques discussed above to decompress the compressed video image V3. However, if the compressed video data contains identification data D1 identifying that the block is a blank region, the image decoder 74 does not use conventional decompression techniques on the block since the block contains no image data to decode. Instead, the decoder 74 decodes the identification data and uses it to generate the non-image area.

Once the image decoder 74 has reconstructed the image, a format transformation device 78 converts the reconstructed image frame V4 to the proper display format. The format transformation device 78 also receives from the image encoder identification data D3 that identifies non-image areas within the frame. The format transformation device may use the identification data to convert the reconstructed image V4 to the display format, as described below. When the reconstructed image V4 has been transformed to a display image V5, the image V5 is displayed on display 80.

In format transformation, an original video image frame from the production equipment is converted to the proper transmission format. As described above, the format transformation may insert blank regions into the frame of video. If blank regions are inserted into the frame, the transformation must create identification data for the blocks that make up the blank regions. The identification data is then provided to the image coder so that it knows not to encode the blank blocks. For each block in the frame, the image coder uses the identification data to determine whether the block is part of a blank region. If so, the image coder forgoes inter-coding or intra-coding of the block and, instead, simply incorporates a blank block indicator in the parameters that define the block and then encodes those parameters, thereby encoding the blank block indicator. For example, the blank block indicator may occupy a portion of the block's description bits. As a result, identification data identifying a blank block may be included in the video compression process while the block itself is not compressed. Alternatively, the identification data for each block may be a single bit that is not incorporated into video compression, but rather is separately encoded and transmitted to the image decoder. The encoded block is then provided to the channel encoder for transmission.

If the video frame contains no blank regions, the identification data will so indicate, and each block will undergo inter-coding or intra-coding in the image encoder. After a block is coded, the image coder sends the block to the channel encoder. The channel encoder then encodes the block and transmits it across the channel.

The image decoding process begins with the channel decoder decoding the compressed video frame and the transmission format data. The format data is provided to the format decoder, which decodes the format and supplies it to the image decoder. The channel decoder also provides the compressed video frame to the image decoder, which decompresses the frame block-by-block. The image decoder begins by decoding block description data. If the corresponding block is blank (i.e., the description data contains a blank block indicator), the image decoder generates the blank block and passes blank block data to the format transformation device. If the block is not blank, the image decoder decompresses the image using the inter-coding or intra-coding decompression techniques described above. The image decoder then provides the decoded block to the format transformation device.

Figure 1:
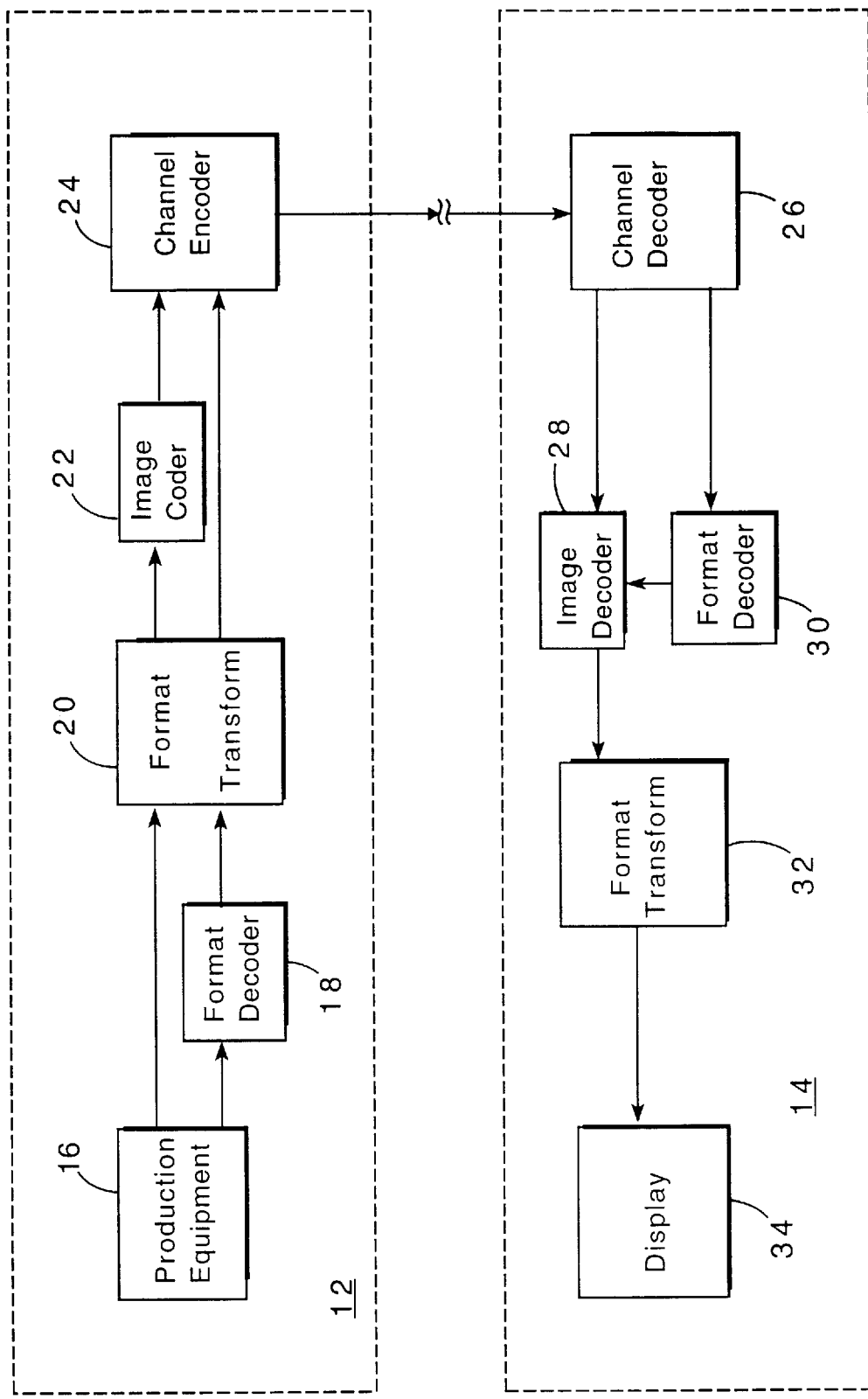
FIG. 1 is a functional block diagram of a conventional video transmission system.
Figure 2A:
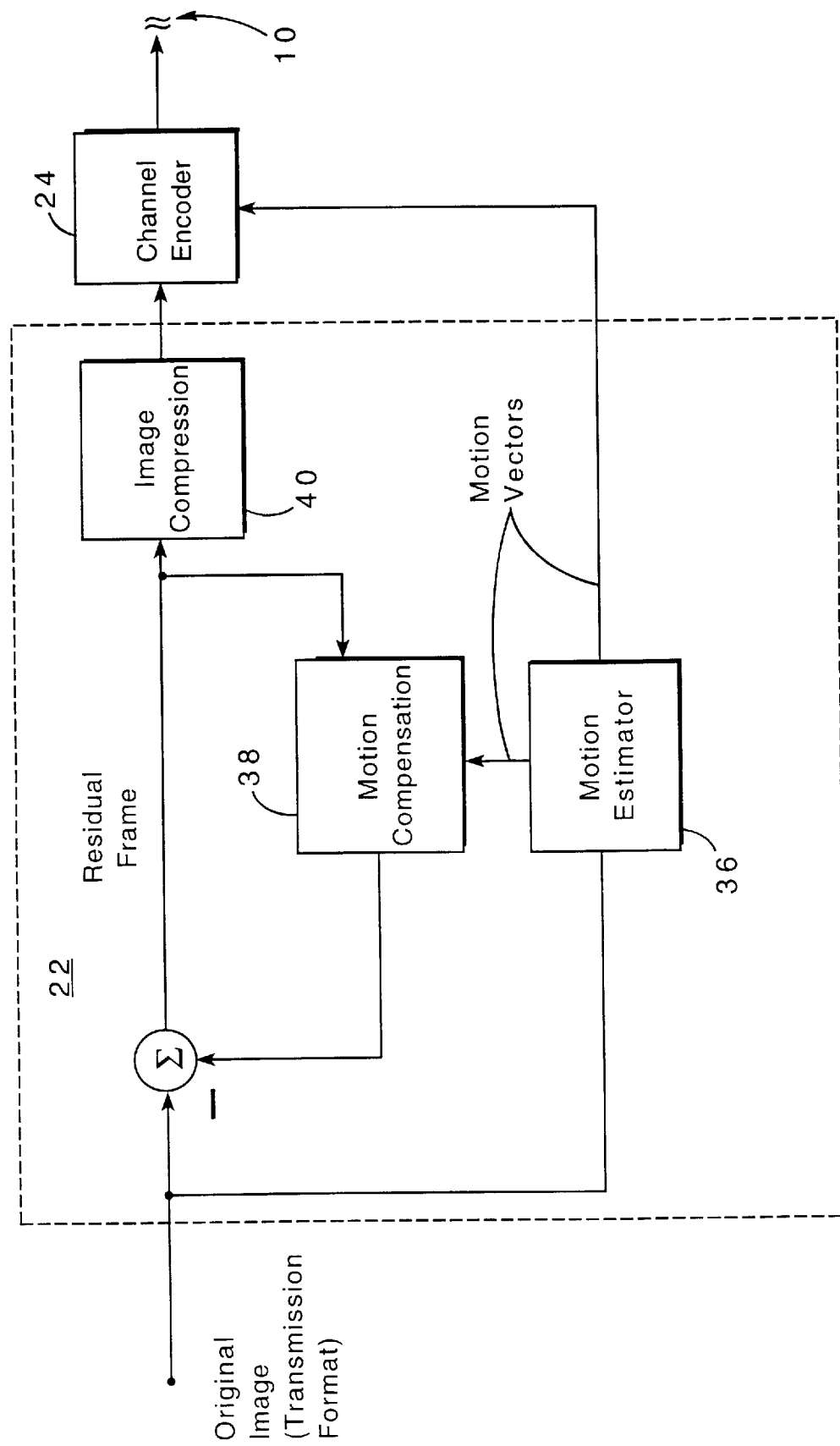
FIGS. 2A and 2B are functional block diagrams of a conventional image encoder and a conventional image decoder, respectively.
Figure 2B:
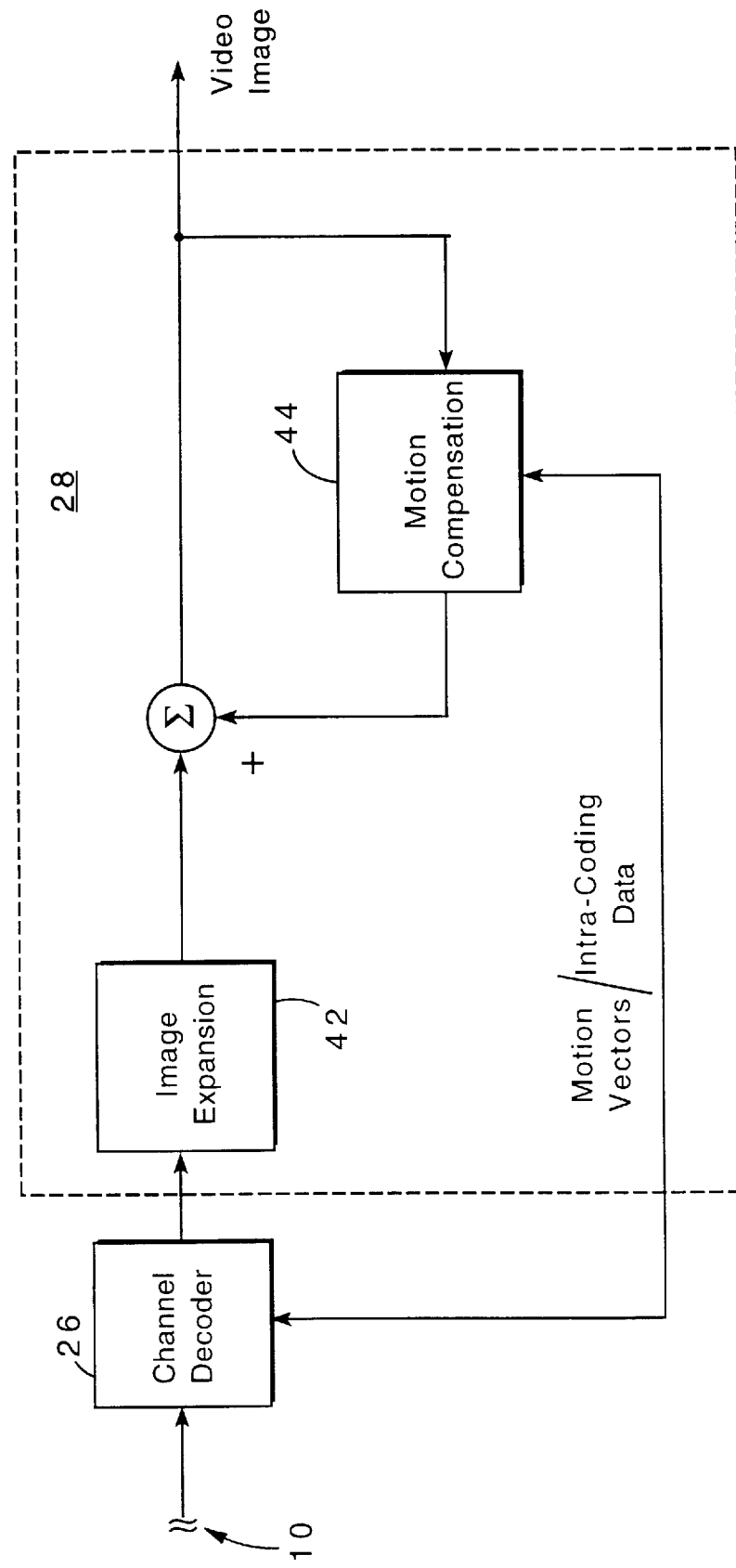
Figure 3A:
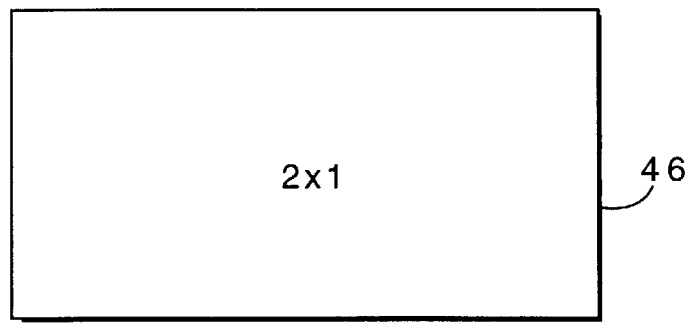
FIGS. 3A through 3C are schematic illustrations of format transformation of a video frame.
Figure 3B:
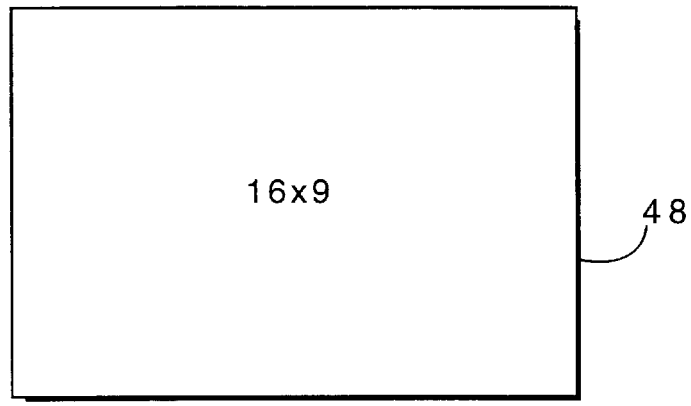
Figure 3C:
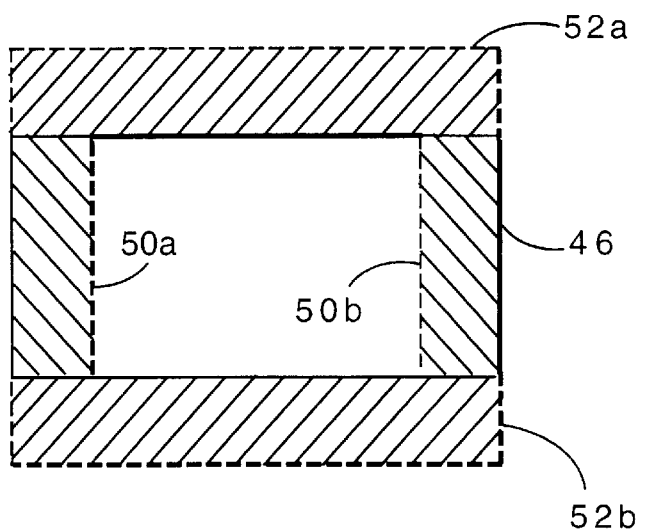
Figure 4A:
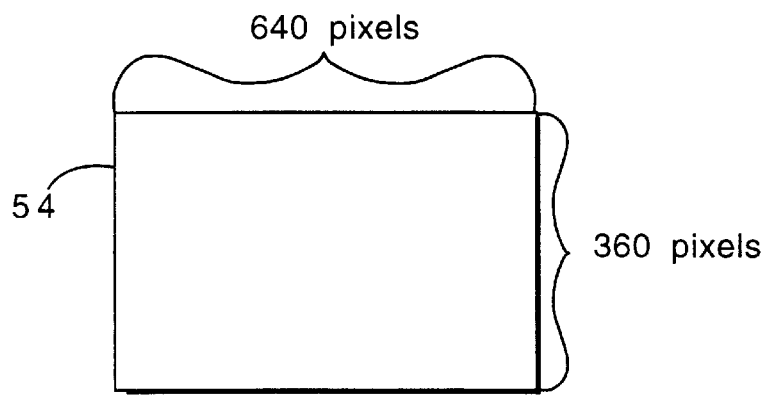
FIGS. 4A through 4C are schematic illustrations of format transformation of a video frame.
Figure 4B:
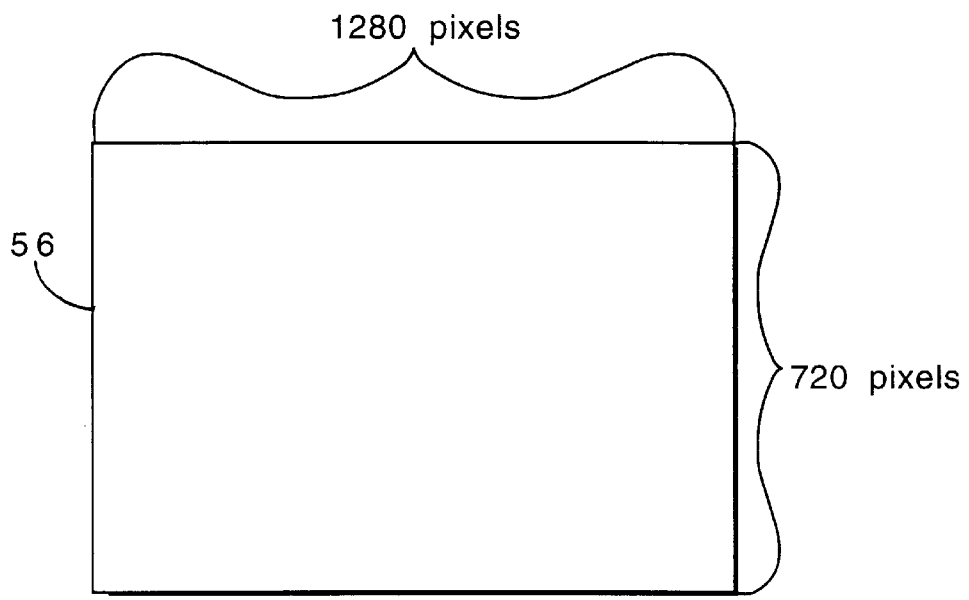
Figure 4C:
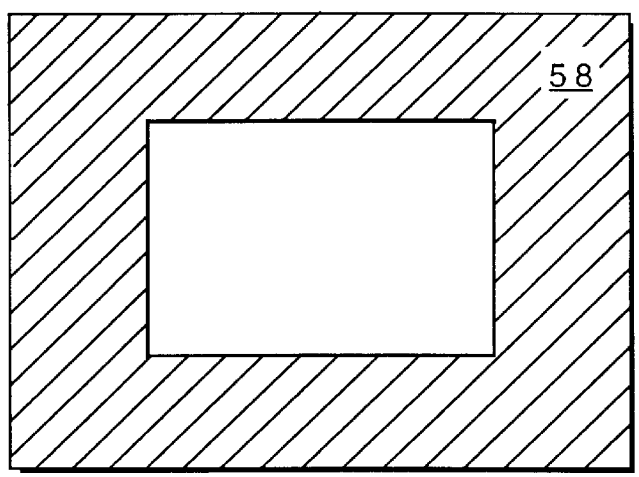

When the image decoder recreates a non-image area, it may leave the area blank by generating blank blocks, or it may fill the area with part of an image to be displayed. For example, the image decoder may use regions 52a, 52b in FIG. 3C to display useful information, such as television programming information, the title of a program in progress, or the start time or end time of a program. The image decoder also may fill the blank regions with color images or with network logos. The decoder also may expand or enhance the video image by interpolating it into the blank regions. In any event, non-image areas may be used as image areas without requiring the system to encode additional image data.

Figure 6:
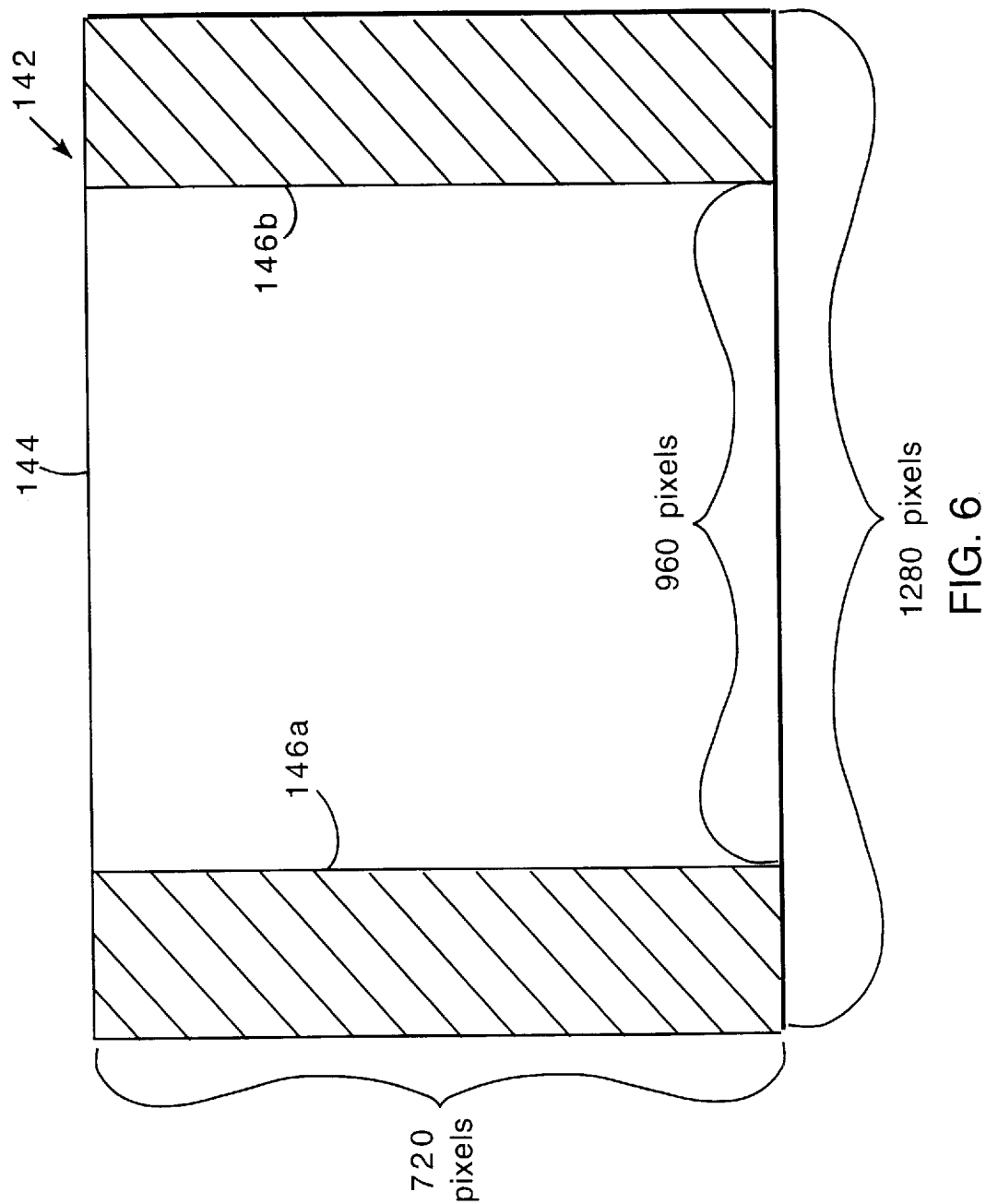
FIG. 6 is a schematic illustration of format transformation of a video frame according to an embodiment of the invention.

When the format transformation device has received the decompressed frame, the frame is converted to the proper display format and then displayed. If the frame contains blank regions, these regions may be used to reformat the frame. For example, FIG. 6 shows a reconstructed frame 142 that is 1280×720 pixels, having an image area 144 of 960×720 pixels and two blank regions 146a, 146b, each 160×720 pixels. If the display format is 960×720 pixels, the format transformation device may format the frame by sending only the image area 144 to the display.

Other Embodiments

Other embodiments are within the scope of the following claims. Some examples follow.

As discussed above, the video transmission system compresses and decompresses a video image frame on a block-by-block basis. For conventional inter-coding and intra-coding techniques, the frame is divided into blocks that are usually 8×8 pixels or 16×16 pixels in size. While the identification data D1 (FIG. 5) may refer to blocks that coincide with these compression blocks, video compression efficiency is further enhanced if the identification data refers to larger blocks. FIG. 7 shows a video frame in which image compression and decompression are performed on blocks that are 16×16 in size, whereas the identification data identifies blocks that are 32×32 pixels in size. Identifying blank regions in this manner reduces the amount of identification data that must be compressed.

The terms "blank region" and "non-image area" may include an area of the video frame that is intended to be a portion of the video image, but is simple or monotonous enough that it does not need to be encoded as an image. For example, a newscast may feature a still image overlying a moving image. The still image may be coded as a "non-image area," for which only descriptive information defining the area must be incorporated into the compressed video frame. The decoder may then reconstruct the still image area using only the descriptive information, instead of using decompressed image data from the area.

The terms "blank region" and "non-image area" may consist of a plurality of noncontiguous areas within a frame.

A "frame" may also consist of a field or a combination of two fields in the case of interlaced video.

The identification data may be coded in many different ways. For example, the locations of blank regions could be specified at the block level, by providing a bit in each block to indicate whether the block is blank, or at the frame level, by providing a frame-level field containing the locations of blank blocks. And in the case of an entire frame having no blank regions, a single bit could be set in the frame header, thereby avoiding the use of a separate bit for each block.

What is claimed is:

1. A method of encoding a television signal, wherein the television signal comprises a succession of video frames, at least some of the video frames having an image area and a non-image area, the method comprising, for a frame having a non-image area:

generating identification data descriptive of the location within the frame of the non-image area;

video encoding only the image area to produce encoded image data; and providing the identification data and the encoded image data as outputs for subsequent decoding of the frame.

2. Apparatus for encoding a television signal, wherein the television signal comprises a succession of video frames, at least some of the video frames having an image area and a non-image area, the apparatus comprising:

means for generating identification data descriptive of the location within the frame of the non-image area;

means for video encoding only the image area to produce encoded image data; and means for providing the identification data and the encoded image data as outputs for subsequent decoding of the frame.

3. The subject matter of claim 1 or 2, wherein the frame of video comprises a plurality of blocks each of which is separately encodable, and wherein the non-image area comprises at least one of the blocks.

4. The method of claim 3, wherein the non-image area comprises more than one of the blocks, and wherein the identification data comprises the locations of the blocks making up the non-image area.

5. The method of claim 1, wherein the step of video encoding the image area comprises one of the following: inter-coding the image area or intra-coding the image area; and wherein the identification data describing the non-image area is encoded using an encoding technique other than inter-coding and intra-coding.

6. The method of claim 1, wherein the non-image area comprises a blank region.

7. A method of processing encoded information to reconstruct a video frame having an image area and a non-image area, comprising:

receiving identification data descriptive of the location within the frame of the non-image area and encoded image data corresponding only to the image area;

decoding the encoded image data to generate the image area;

using the identification data to generate the non-image area; and combining the image area with the non-image area.

8. Apparatus for processing encoded information to reconstruct a video frame having an image area and a non-image area, comprising:

means for receiving identification data descriptive of the location within the frame of the non-image area and encoded image data corresponding only to the image area;

means for decoding the encoded image data to generate the image area;

means for using the identification data to generate the non-image area; and means for combining the image area with the non-image area.

9. The subject matter of claim 7 or 8, wherein the non-image area comprises a blank region.

10. The subject matter of claim 7 or 8, further comprising expanding the image into the non-image area by interpolating the image contained in the image area.

11. The subject matter of claim 7 or 8, further comprising displaying the video frame.

12. The subject matter of claim 11 wherein an image other than the decoded image is displayed in the non-image area.

13. The subject matter of claim 7 or 8, further comprising altering the dimensions of the non-image area to give the video frame a predetermined spatial resolution.

14. A method for encoding, transmitting, decoding, and displaying a video frame, comprising:

producing a video image;

processing the video image to produce a formatted video frame by adding a blank region to the video image;

generating identification data descriptive of the location of the blank region;

encoding only the video image portion of the formatted video frame to produce an encoded image;

transmitting the identification data and the encoded image to a display device;

using the identification information to reconstruct the blank region;

decoding the encoded image to produce a decoded video image;

reconstructing the formatted video frame by combining the reconstructed blank region with the decoded video image; and displaying the reconstructed formatted video frame.

15. Apparatus for encoding, transmitting, decoding, and displaying a video frame, comprising:

means for producing a video image;

means for processing the video image to produce a formatted video frame by adding a blank region to the video image;

means for generating identification data descriptive of the location of the blank region;

means for encoding only the video image portion of the formatted video frame to produce an encoded image;

means for transmitting the identification data and the encoded image to a display device;

means for using the identification information to reconstruct the blank region;

means for decoding the encoded image to produce a decoded video image;

means for reconstructing the formatted video frame by combining the reconstructed blank region with the decoded video image; and means for displaying the reconstructed formatted video frame.

16. The subject matter of claim 14 or 15 further comprising processing the reconstructed formatted video frame by converting its format to a predetermined display format prior to displaying the video frame.

\* \* \* \* \*